J. Hicks,
Stump Elevator.
No. 2,802. Reissued Nov. 19, 1867.
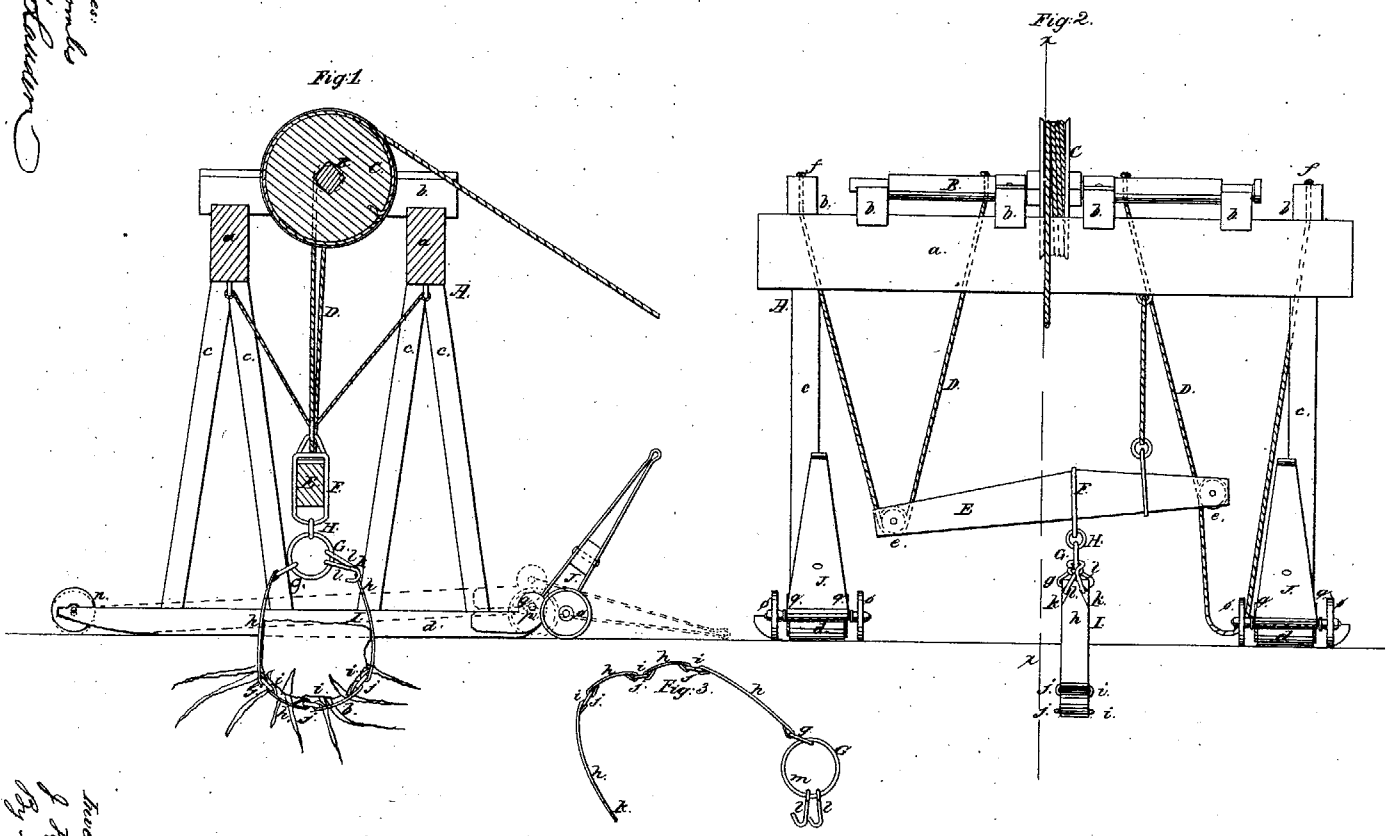
Witnesses:
H. W. Coombs
R. B. H. Lauder
Inventor:
J. Hicks
By Munn & Co.
AM. PHOTO-LITHO. CO. N.Y. (OSBORNE'S PROCESS)

United States Patent Office.

ISAAC HICKS, OF HARTFORD, WISCONSIN.

*Letters Patent No.* 40,478, *dated November* 3, 1863; *reissue No.* 2,802, *dated November* 19, 1867.

IMPROVEMENT IN STUMP-EXTRACTORS.

The Schedule referred to in these Letters Patent and making part of the same.

TO ALL WHOM IT MAY CONCERN:

Be it known that I, ISAAC HICKS, of Hartford, in the county of Washington, and State of Wisconsin, have invented a new and useful Improvement in Machines for Extracting Stumps, Elevating Stone and other Heavy Bodies, and conveying the same from place to place; and I do hereby declare that the following is a full, clear, and exact description thereof, which will enable those skilled in the art to make and use the same, reference being had to the accompanying drawings, forming a part of this specification, in which Figure 1 is a transverse vertical section of the same.

Figure 2, a front view of the same.

Figure 3, a detached view of the hook pertaining to the same.

Similar letters of reference in each of the figures indicate corresponding parts.

The object of my invention is to obtain a simple and efficient device by which stumps may be readily extracted from the earth, stones and other heavy bodies elevated and moved from place to place with the greatest facility. And this I do by the employment or use of a bar, suspended from a windlass placed upon a frame mounted on wheels, with hitching tackle, arranged in a novel manner to produce the desired effect.

A represents a framing, composed of two parallel bars, *a a*, connected by cross-bars *b*, and supported at a suitable height by inclined bars, *c*, which are attached to bed-pieces *d d;* B, shaft, with a pulley, C, on it, making a windlass; D D, ropes or chains, with one end of each fastened to the windlass, B and the other ends to the cross-bars *b* of the frame A passing round pulleys *e* in the ends of bar E. From this bar E is a rope or chain, the upper end fastened to the upper part of the frame A, and the other end to a strap round bar E, to form a rest or fulcrum for the bar E. F, a clip or metal strap round bar E, for the purpose of hitching the load to, designed to be raised. G, a ring, suspended from clip F by a link, H, and to the ring G a jointed band, I, or hook, attached by a link, *g*. This band or hook, I, is made of a series of plates, *h*, connected by joints. These plates are made curving, (to facilitate hitching to stumps, as will be shown in the operation,) with a link at one end to connect it with ring G, and with notches K in the sides of the other end, into which fastens hooks *s s*, making the lifting tackle. In the back end of the bed-pieces is placed a small wheel, *n*, and to the front of each bed-piece there is attached a metal frame, J. These metal frames J may be made by bending metal plates in V-form, one part of the plate being directly over the other. The upper prongs of the V's are provided with journals *h*, which are fitted in eyes *g*, attached to the bed-pieces. The wheels *o* are attached to the lower prongs of the V-frames. By this arrangement it will be seen that when the outer ends of frames J are forced down, the wheels *o* will be brought under the bed-pieces, and when they are lifted up the wheels *o* move forward and the bed-pieces rest on the ground, the axles of the wheels forming a fulcrum, and the frames J levers to raise and lower the front of the frame. This operation is shown in fig. 1, in which the bed-pieces are shown in black, resting on the ground, and supported by the wheels in red outline.

Operation: To extract a stump, the operator opens the jointed bands I by unhooking the notched end from the ring G, and placing its point into the earth by the side of the stump, and pressing it downward until the outer plate is entirely buried. The next plate is then pressed into the earth in like manner, and so on till the point of the first plate appears above the ground at the opposite side of the stump. The curve of the plate will produce this result. The machine is then adjusted over the stump, if not already so placed. The band I is then connected. The fulcrum is then placed as near the strap F as required to give the desired purchase. The rope or chains at the end of bar E, near the fulcrum, are left slack. The machinery is then ready for action. Then power is applied to pulley C on the shaft B, and as the shaft turns, rope D, at the long end of bar E, is drawn up, and, lifting that end of the bar, extracts the stump. As it rises, the other rope, D, is made taut, and both ends of the bar E are then raised together, raising the load as high as required. When the stump is being extracted or a load raised, the ends of the frames J are raised, letting the bed-pieces of frame A rest on the ground so as to form a firm base for the machine. When the load is raised as high as required, the ends of frames J are brought down, and the wheels *o* receive the load. Then the machine can be hauled, with its load, to any place desired.

What I claim as my invention, and desire to secure by Letters Patent, is—

1. Shaft B, pulley C, bar E, with its hanging fulcrum, ropes or chains D D, strap F, and band I, in combination, substantially as described.

2. Frames J and wheels *o*, in combination, substantially as described.

ISAAC HICKS.

Witnesses:

G. W. MYGATT,

H. C. KOCH.